United States Patent
Kösters et al.

(10) Patent No.: US 7,324,219 B2
(45) Date of Patent: Jan. 29, 2008

(54) METHOD AND DEVICE FOR CARRYING OUT A MEASUREMENT ON A CLAW COUPLING

(75) Inventors: Jürgen Kösters, Laer (DE); Stefan Daszkowski, Emsdetten (DE)

(73) Assignee: KTR Kupplungstechnik GmbH, Rheine (DE)

( * ) Notice: Subject to any disclaimer, the term of this patent is extended or adjusted under 35 U.S.C. 154(b) by 187 days.

(21) Appl. No.: 11/303,315

(22) Filed: Dec. 16, 2005

(65) Prior Publication Data

US 2006/0135266 A1    Jun. 22, 2006

(30) Foreign Application Priority Data

Dec. 18, 2004    (DE)    ................... 10 2004 061 096

(51) Int. Cl.
    *G01B 11/14*    (2006.01)
(52) U.S. Cl. ........................ 356/625; 356/614
(58) Field of Classification Search .................. None
    See application file for complete search history.

(56) References Cited

U.S. PATENT DOCUMENTS

| 4,783,998 | A | 11/1988 | Sander |
|---|---|---|---|
| 5,990,473 | A | 11/1999 | Dickey et al. |
| 6,363,318 | B1 * | 3/2002 | Wang et al. ................. 701/110 |
| 6,450,044 | B1 | 9/2002 | Eisenhauer et al. |
| 7,048,633 | B2 | 5/2006 | Gödde et al. |
| 2004/0097289 | A1 | 5/2004 | Gödde et al. |

FOREIGN PATENT DOCUMENTS

| DE | 274 260 | 12/1989 |
|---|---|---|
| EP | 1 004 009 | 10/2001 |
| EP | 1 420 182 | 5/2004 |

OTHER PUBLICATIONS

KTR 2004 Catalogue, KTR Kupplungstechnik GmbH, Rodder Damm 170, 48432 Rheine, Germany (pp. 17-42).

* cited by examiner

*Primary Examiner*—Michael P. Stafira
(74) *Attorney, Agent, or Firm*—Collard & Roe, P.C.

(57) ABSTRACT

In a method and a device for carrying out a measurement on a claw coupling including two coupling halves, each having claws which engage in the claws of the other coupling half, the distance between adjacent intermeshing claws is measured using a single light beam directed onto the claw region. It is thereby possible to measure the angle of twist of the coupling halves in a particularly simple fashion.

11 Claims, 5 Drawing Sheets

US 7,324,219 B2

METHOD AND DEVICE FOR CARRYING OUT A MEASUREMENT ON A CLAW COUPLING

CROSS REFERENCE TO RELATED APPLICATIONS

Applicants claim priority under 35 U.S.C. §119 of German Application No. 10 2004 061096.7 filed on Dec. 18, 2004.

BACKGROUND OF THE INVENTION

1. Field of the Invention

The invention relates to a method for carrying out a measurement on a claw coupling comprising two coupling halves, each having claws which engage in the claws of the other coupling half. The invention further relates to a device for carrying out a measurement on a claw coupling comprising two coupling halves, each having claws which engage in the claws of the other coupling half.

2. The Prior Art

Claw couplings of this type are known and are sold for example by KTR Kupplungstechnik GmbH, Rodder Damm 170, 48432 Rheine, Germany under the trade name Rotex and are described, for example, in the complete 2004 catalogue of the company KTR on pages 17 ff. The claw couplings of this type generally have a ring gear or sprocket made of an elastomer material whose teeth are arranged between the intermeshing claws and allow a certain twistability of the coupling halves with respect to one another. Instead of a ring gear, individual tooth elements and double tooth elements can also be inserted.

SUMMARY OF THE INVENTION

It is the object of the invention to provide a method and a device of the type specified initially with which the claw coupling can be monitored in an especially simple manner.

This object is solved using a method and a device in accordance with the invention. The method carries out a measurement on a coupling including two coupling halves, each having claws which engage in the claws of the other coupling half. In accordance with the method, the measurement takes place when the claw coupling is in running operation. Precisely one light beam is directed to and reflected from the rotating claw region, and the reflected light beam is received by precisely one receiver. At least one distance is measured between adjacent intermeshing claws. The device is is especially designed for carrying out the method according to the invention. The device includes precisely one light-beam generating device. The light-beam generating device is directed onto the claw coupling such that the generated light strikes alternately on the reflecting claws and the less reflecting areas between the claws on the rotating claw coupling. The device has precisely one receiver for detecting the reflected light beam. Advantageous embodiments of the invention are discussed below.

In a method for carrying out a measurement on a claw coupling comprising two coupling halves each having claws which engage in the claws of the other coupling half, it is important to the invention that the measurement is made when the claw coupling is running, that precisely one light beam is directed to and reflected at the rotating claw area and the reflected light beam is received by precisely one receiver and at least one area, especially the distance between two adjacent, intermeshing claws is measured.

On the basis of this information, taking into account a normal distance between two claws, that is of a claw coupling which is not operating, it is possible to determine the angle of twist of the two coupling halves. The method can be executed using a single measurement. The method can thus be carried out with comparatively low expenditure.

The measurement is preferably carried out when the claw coupling is operating normally. It is also possible to build special test rigs and test the claw coupling there under defined conditions. A particular advantage of the invention is that this can be carried out on normal or series-produced claw couplings which do not need to be modified to carry out the measurement. The method of measurement according to the invention uses the claw coupling as it stands with no need for it to be modified.

Preferably at least two adjacent distances between the intermeshing claws are measured. The distances are then compared to one another since as a result of the twisting of the coupling halves with respect to one another, one of the distances is enlarged compared with the normal state and one of the two distances is reduced compared with the normal state. In a particularly preferred embodiment, the measurement is continuously carried out for each distance between the intermeshing claws. In this way, a permanent monitoring can be achieved.

In a continuous measurement of each claw and each distance between the claws, if the number of claws of the coupling is known, the speed of the coupling can also be determined by the method according to the invention.

The measurement is carried out as an optical measurement, wherein precisely one light beam is transmitted to the claw area, this beam being reflected substantially more strongly from the surface of the metallic claws than from the surface of the elastomer of the ring gear or sprocket arranged between the claws. The light beam is thus reflected with different intensity at the rotating claw area and evaluated accordingly by a receiver. The reflection at the metal claws is preferably compared with the reflection at the area between the metal claws. Since the width of the metal claws remains unchanged, a value independent of speed can be obtained from a comparison of the two values during running operation.

Information on the angle of twist of the coupling halves with respect to one another is initially obtained from the measurement. Information on the torque can preferably be derived from the measurement. This is especially the case when the deformation behavior of the ring gear is known. Then, information on the torque can be derived from the calculated angle of twist of the coupling halves. In another preferred embodiment of the invention, information on the state, especially the wear state of the ring gear can be deduced from the measurement, especially when a certain torque is applied to the coupling and information available concerning the maximum angle of twist which should be obtained for this specific torque with the ring gear still intact. In a further preferred embodiment of the invention, information on the state of a larger unit in which the coupling is located is deduced from the measurement. During operation of a larger unit, especially a larger machine, it can be recorded as noteworthy that the angle of twist of the coupling halves has increased with actually the same settings, that is a larger torque is applied to the coupling. This indicates that the larger unit is not running optimally and must be maintained.

In a device for carrying out a measurement on a claw coupling comprising two coupling halves each having claws which engage in the claws of the other coupling half, especially for carrying out the method described above, it is important for the invention that the device has precisely one light-beam generating device, that the light-beam generating device is directed onto the claw coupling such that the generated light beam impinges or strikes alternately on the reflecting claws and the less reflecting areas between the claws on the rotating claw coupling and that the device has a receiver for detecting the reflected light beam. As a result of the different intensity of the reflection of the light beam in the claw area, namely once from the surface of the metal cams and once from the surface of the ring gear, which is made up of elastomer, the distances between the individual claws, namely the areas in which the ring gear determines the distance between the claws can be measured. Precisely one light-beam generating device is sufficient for this.

At the same time, for the device the distance between the claw coupling and the light-beam generating device and the receiver is variable. The distance can be selected relatively freely in a comparatively large range and is not specified by the device according to the invention to a quite specific distance.

The light-beam generating device preferably has at least one light emitting diode (LED). The receiver is preferably constructed as a photodetector. In addition, the receiver preferably has a signal preparation unit and a calculation unit. The light-beam generating device and the receiver are preferably constructed as a retro-reflective sensor.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
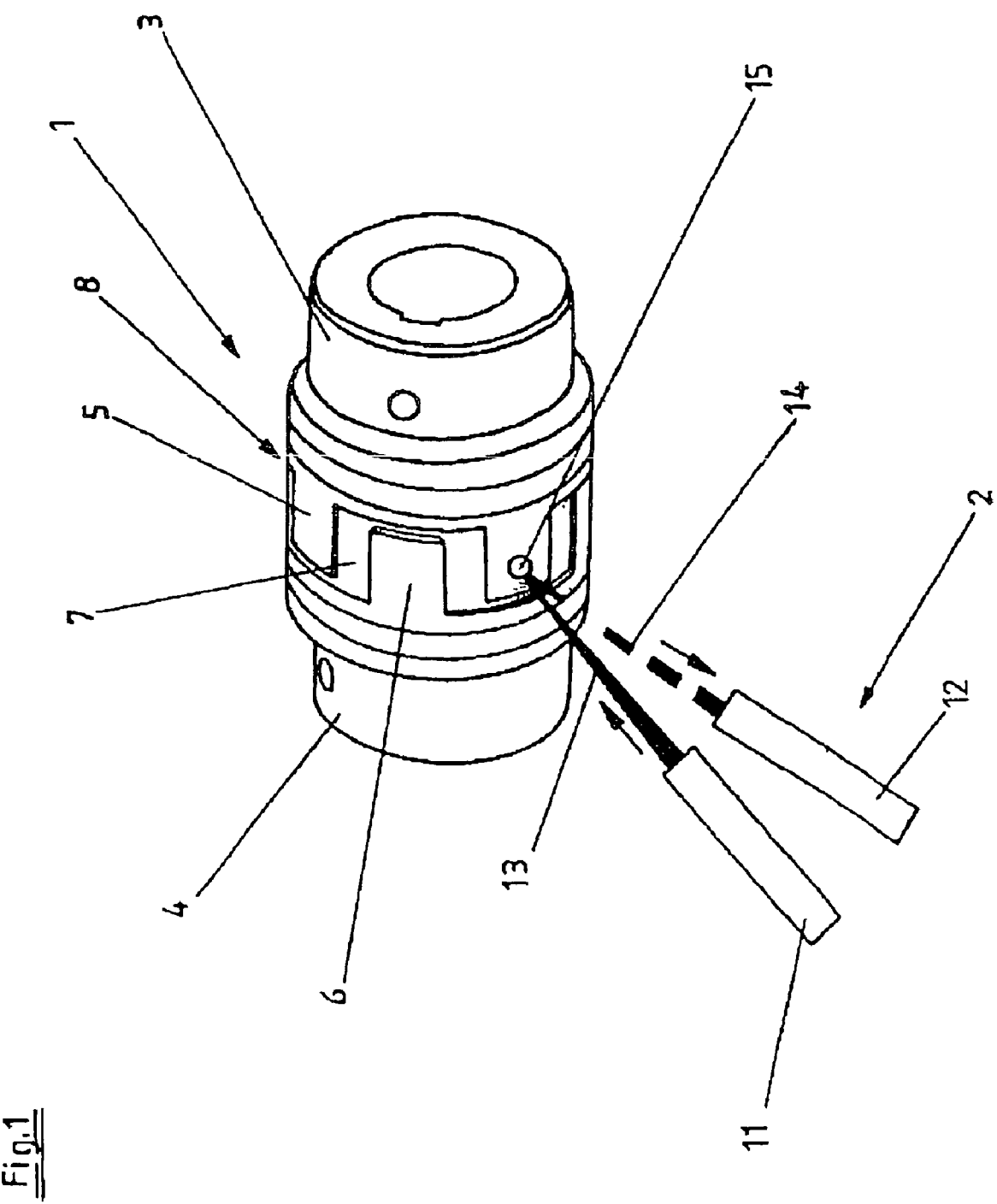
FIG. 1 shows a claw coupling with a coupling according to the invention.

Turning now in detail to the drawings, FIG. 1 shows a claw coupling 1 and a device 2 according to the invention for carrying out a measurement on claw coupling 1. Claw coupling 1 is made up of two coupling halves 3 and 4, wherein the claws 5 of coupling half 3 and the claws 6 of coupling half 4 intermesh and jointly form a claw region 8. The individual claws 5 and 6 are constructed with a certain spacing from one another. One of these faces forming the spacing is designated by 7 in FIG. 1. Teeth of a ring gear or individual teeth of an elastomer material lie in these faces. The transmitter 11 of device 2 transmits a light beam 13 which is directed onto a point 15 in claw region 8. From there the light is reflected and the reflected light beam 13 is received by a receiver 12 and further evaluated. The surfaces of the metal cams or claws 5 and 6 reflect the light substantially more strongly than the surface of the elastomer of the ring gear in the regions 7 between the cams. After suitable preparation, a rectangular signal having the allocation "high level" is formed at claws 5 and 6 and "low level" in the spacings 7 between the claws or cams. In the case of a coupling having four claws or cams per coupling half, a rectangular curve is obtained having 8 high and 8 low levels per revolution.

Figure 2:
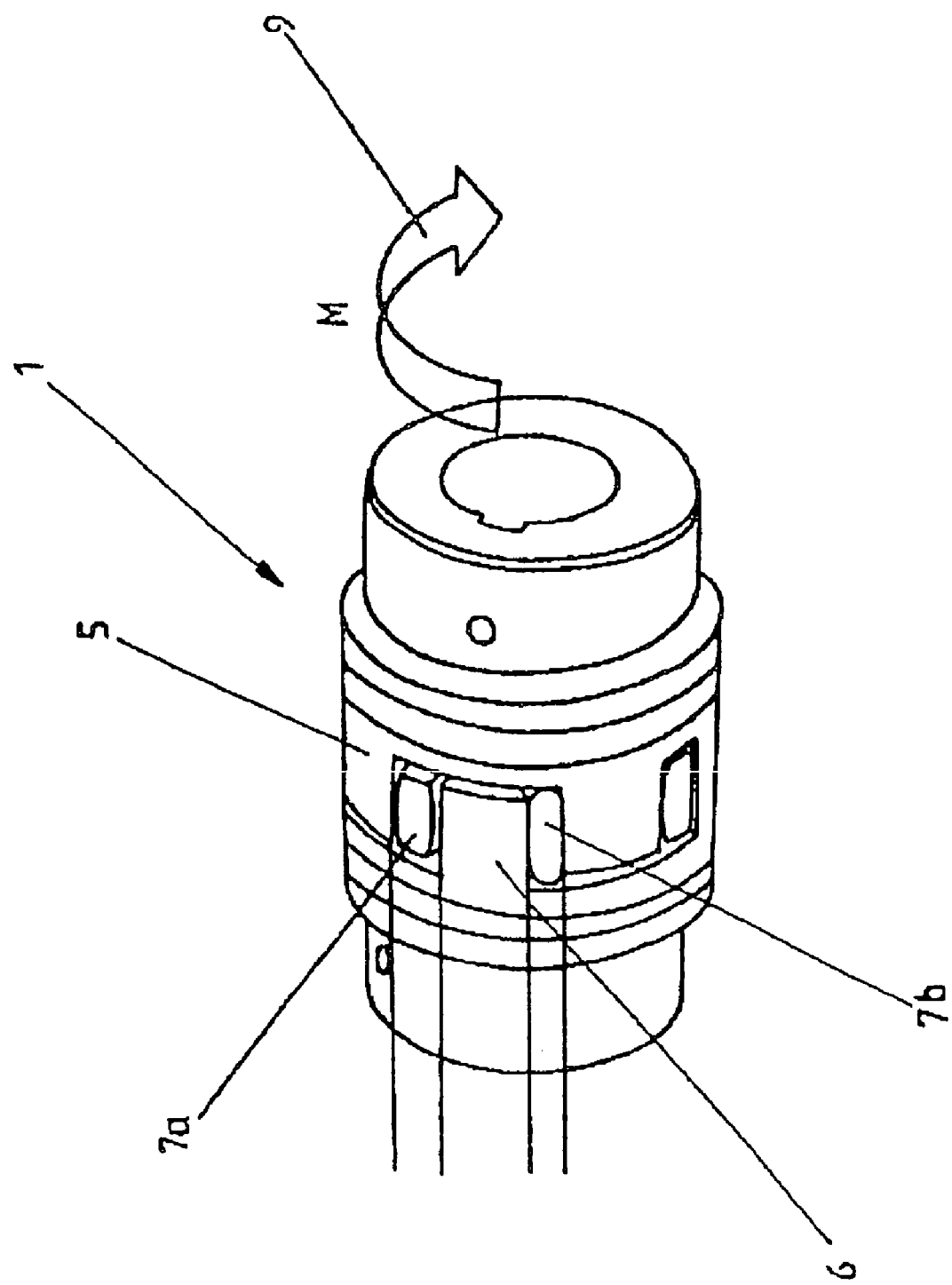
FIG. 2 is a view of a claw coupling wherein the coupling halves are twisted with respect to one another.

FIG. 2 shows a coupling 1 which is turned in the direction of the arrow 9 with a torque M. As a result of the loading, the distances between the intermeshing claws 5 and 6 vary. The coupling halves are turned by a certain number of degrees with respect to one another and the ring gear is pressed together under the torque loading. The distance 7b, for example, is reduced compared with the unloaded diagram in FIG. 1 whilst the distance 7a is enlarged compared with the unloaded coupling. Whereas the reflecting claws have a constant length, the travel time of the plastic teeth changes to and fro between two values.

Figure 3:
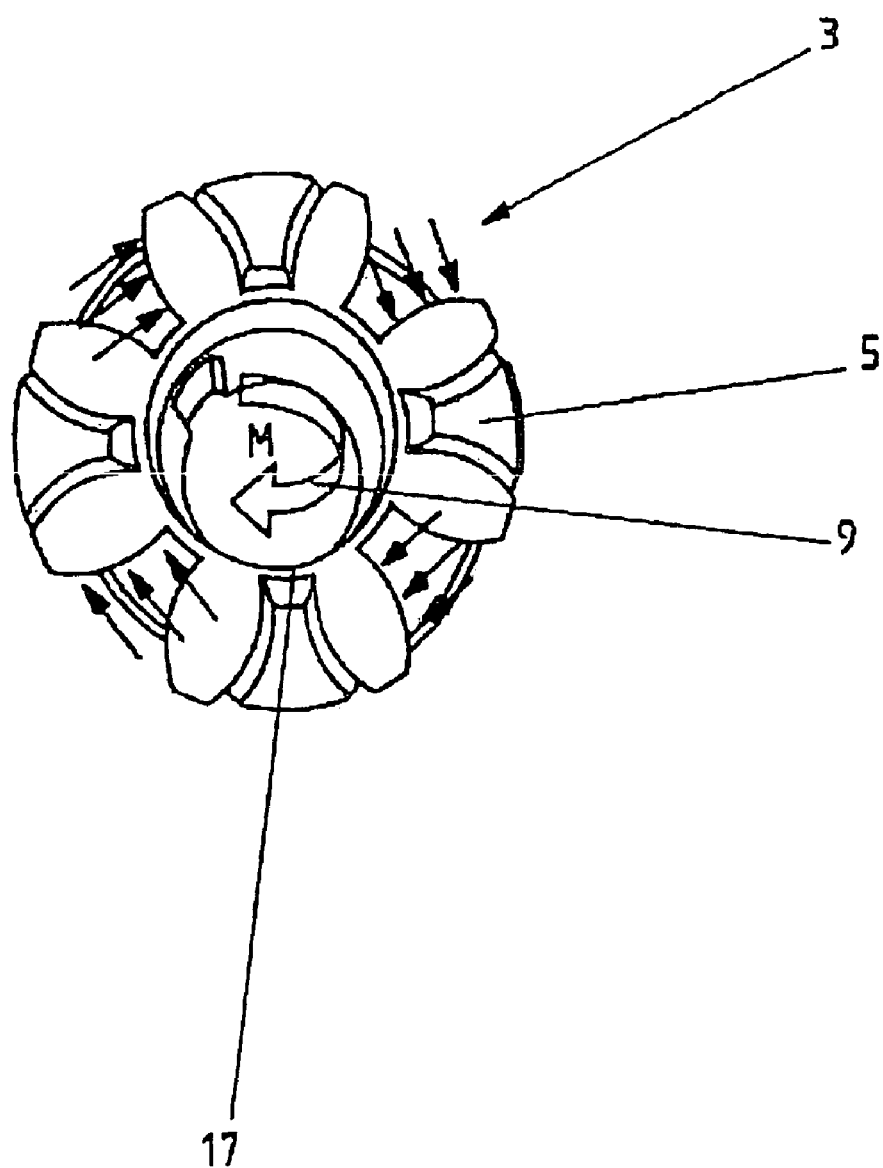
FIG. 3 is a view of a coupling half with ring gear.

FIG. 3 shows a coupling half 3 with claws 5 and a ring gear 17 inserted therein, where respectively every other tooth is pressed together according to the arrows indicated.

Figure 4:
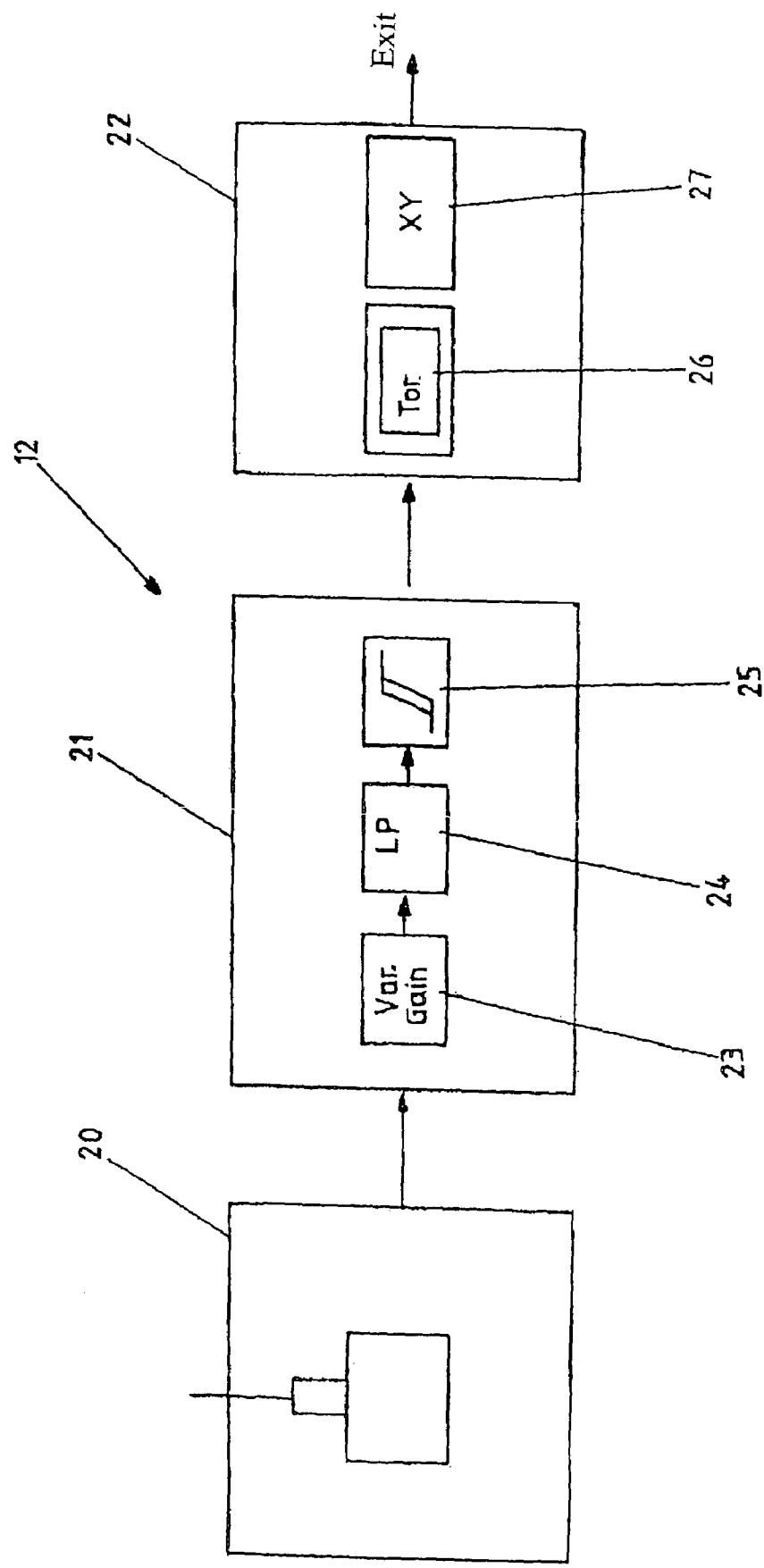
FIG. 4 is a schematic diagram of the receiver of the device according to the invention.

The receiver 12, comprising optics 20, signal preparation 21 and a microprocessor 22 is shown schematically in FIG. 4. Optics 20 comprises a retro-reflective sensor which receives the light pulses transmitted from the transmitter to the claw coupling and light pulses reflected there. The signal thus obtained is digitized in the signal preparation system 21 where the signal is first passed to a variable gain 23, then to a low-pass filter 24 and then to a Schmitt trigger 25 so that a rectangular signal is obtained from the sine signal. The signal thus obtained is fed to a microprocessor 22 wherein in a first step a time interval measurement is made between the individual pulses using a gate circuit 26 and in a calculation unit 27 the time intervals are converted into distances or ultimately into an angle of twist between the two coupling halves. A further evaluation according to the possibility claimed above can follow.

Figure 5:
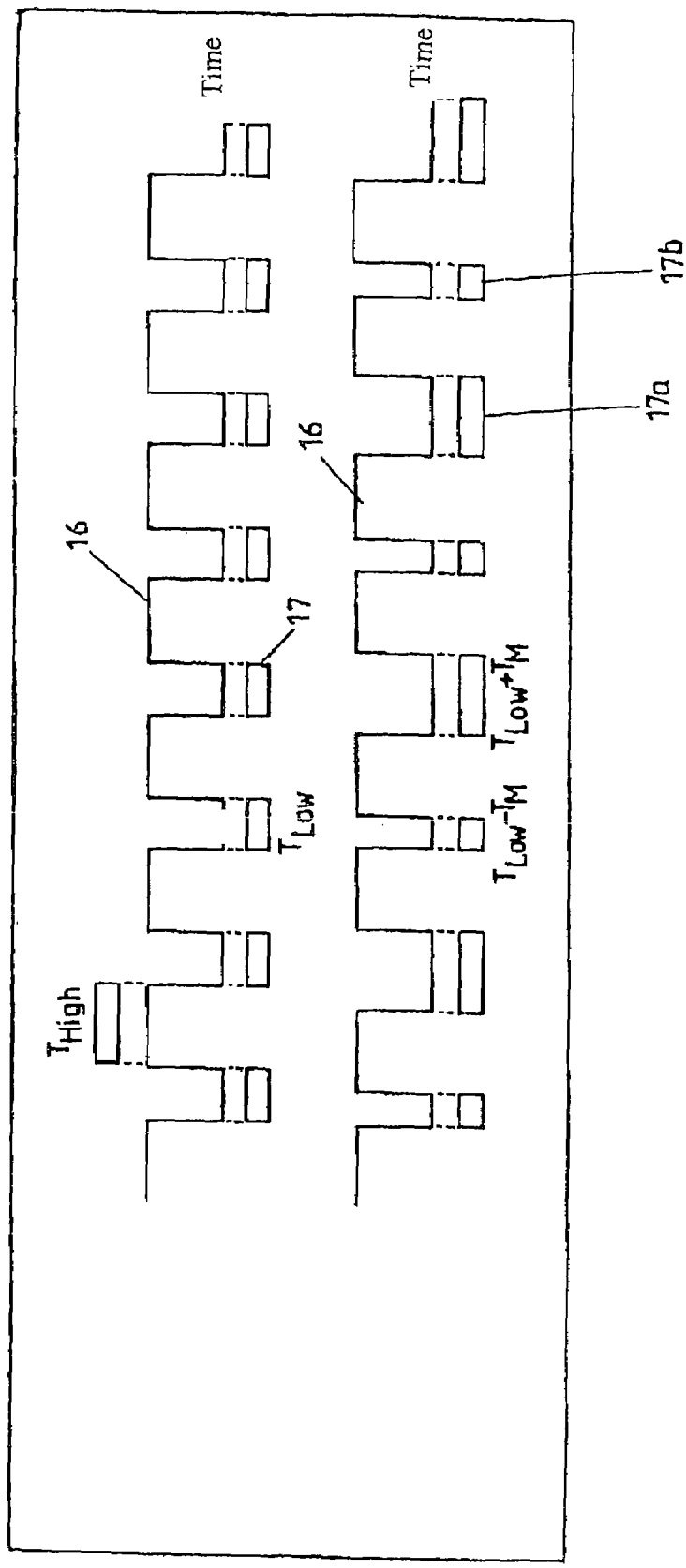
FIG. 5 shows two series of measurements.

FIG. 5 shows two measurement curves such as are obtained after the signal preparation (in idealised form). The upper curve shows the rectangular curve without torque. The times of the high level are constant. The times of the low level are constant. The high level is formed by reflection of light at the metal parts of the claw coupling whereas the low levels are formed by the substantially weaker reflection of light at the non-metallic ring gear. The lower curves shows a measurement at a claw coupling with torque. The high levels 16 are constant again as expected since the claws remain unchanged. However, the times of the low level 17 vary as was to be expected in accordance with FIG. 2. A calculation can now be made either from the absolute values or the absolute difference between the times of the different low levels 17a and 17b or a relative factor TM/T high can be calculated relative to the constant high signal which gives information on the angle of twist independent of speed.

Although only at least one embodiment of the present invention has been shown and described, it is to be understood that many changes and modifications may be made thereunto without departing from the spirit and scope of the invention as defined in the appended claims.

What is claimed is:

1. A method for carrying out a measurement on a claw coupling comprising two coupling halves, each half having claws engaging in the claws of the other coupling half, wherein the measurement takes place when the claw coupling is in running operation, said method comprising the following steps:

(a) directing precisely one light beam to a rotating claw region and reflecting the light beam from the rotating claw region as a reflected light beam;
(b) receiving the reflected light beam by precisely one receiver; and
(c) measuring at least one distance between adjacent intermeshing claws.

2. The method according to claim 1, wherein two adjacent distances between the intermeshing claws are measured and the distances compared with one another.

3. The method according to claim 1, wherein the measurement is carried out continuously for each distance between the intermeshing claws.

4. The method according to claim 1, wherein duration of reflection at the reflecting claw is compared with duration of reflection in a less reflecting region between reflecting claws.

5. The method according to claim 1, wherein information on angle of twist is deduced from the measurement.

6. The method according to claim 1, wherein information on state of ring gear wear is deduced from the measurement.

7. The method according to claim 1, wherein the claw coupling is located in a larger unit and information on a condition of the larger unit is deduced from the measurement.

8. A device for carrying out a measurement on a rotating claw coupling comprising two coupling halves, each half having reflecting claws engaging in the reflecting claws of the other coupling halves, the device comprising:
(a) precisely one light-beam generating device, the light-beam generating device being adapted to be directed onto the claw coupling so that a generated light beam strikes alternately on the reflecting claws and on less reflecting areas between the claws on the rotating claw coupling; and
(b) precisely one receiver for detecting the reflected light beam.

9. The device according to claim 8, wherein the light-beam generating device comprises at least one light emitting diode.

10. The device according to claim 8, wherein the receiver comprises at least one photodiode.

11. The device according to claim 8, wherein the receiver comprises optics, a signal preparation device, and a microprocessor.

* * * * *